United States Patent
Choong

(10) Patent No.: US 9,220,058 B1
(45) Date of Patent: Dec. 22, 2015

(54) MULTI-PROTOCOL LOAD CONTROL

(75) Inventor: Jason Yew Choo Choong, Mountain View, CA (US)

(73) Assignee: Daintree Networks, Pty. Ltd., Scoresby (AU)

( * ) Notice: Subject to any disclaimer, the term of this patent is extended or adjusted under 35 U.S.C. 154(b) by 1082 days.

(21) Appl. No.: 13/014,374

(22) Filed: Jan. 26, 2011

(51) Int. Cl.
*G08C 17/00* (2006.01)
*H04W 52/02* (2009.01)
*H04W 84/12* (2009.01)

(52) U.S. Cl.
CPC .......... *H04W 52/02* (2013.01); *H04W 52/0216* (2013.01); *H04W 52/0229* (2013.01); *H04W 84/12* (2013.01)

(58) Field of Classification Search
CPC ....................................................... H04W 4/04
USPC .......... 370/331, 332, 333, 334; 455/517, 219, 455/225, 551, 560
See application file for complete search history.

(56) References Cited

U.S. PATENT DOCUMENTS

| | | | |
|---|---|---|---|
| 7,797,084 B2 | 9/2010 | Miwa | |
| 7,917,232 B2 | 3/2011 | McCoy | |
| 2008/0167756 A1* | 7/2008 | Golden et al. | 700/297 |
| 2009/0187499 A1* | 7/2009 | Mulder et al. | 705/30 |
| 2010/0324962 A1* | 12/2010 | Nesler et al. | 705/8 |
| 2011/0047418 A1* | 2/2011 | Drees et al. | 714/57 |
| 2011/0231320 A1* | 9/2011 | Irving | 705/80 |
| 2013/0035992 A1* | 2/2013 | Silverman | 705/14.1 |

* cited by examiner

*Primary Examiner* — Hassan Kizou
*Assistant Examiner* — Abdelnabi Musa
(74) *Attorney, Agent, or Firm* — Fish & Richardson P.C.

(57) ABSTRACT

Methods, systems, and apparatus, for wirelessly controlling electrical loads. In an aspect, a system include a wireless controller with a communication subsystem that communicates with a plurality of power control devices over a first network, communicates with a wireless smart metering device over a second network, communicates with a system controller over a third network. The system receives an event message from one or more of the wireless smart metering device over the second network or the system controller over the third network, generates one or more power commands for the power control devices, the one or more power commands configured to cause the power control devices to adjust one or more power loads in response to the event message, and transmits the one or more power commands to the power control devices over the first network.

16 Claims, 4 Drawing Sheets

MULTI-PROTOCOL LOAD CONTROL

BACKGROUND

This specification relates to wireless control of electrical loads.

Energy providers, (e.g., utilities and utility commissions) are pursuing public and technology policies that will allow them to "smooth" energy consumption over peak usage periods. By efficiently managing energy usage, the energy providers can avoid the need to build new power stations and distribution infrastructure, resulting in significant cost savings and energy conservation.

Two focus areas in which energy management is experiencing penetration are the residential environment and the commercial environment. For the residential environment, wireless smart meters are used, and allow the energy providers to send demand response events (e.g., commands that adjust the load in the residential environment) and pricing signals (e.g., a unit price per kilowatt hour is now doubling) to encourage load shedding during peak load conditions. For the commercial environment, protocols such as OpenADR are being used to allow utilities to connect into the commercial building to provide similar information.

However, there are many commercial and public environments for which satisfactory energy management networks have not been developed. For example, an entity such as a chain of several dozen restaurants located in several states may desire to have the power consumption of its locations managed intelligently. However, OpenADR (and other technologies using the Internet for the communication interface between the utility and the entity locations) is a technology that assumes that the building has a building control system that can take the OpenADR signals and convert them into commands to controllers of controlled devices within the location. Many of the commercial and public entities, however, do not have systems deployed that can facilitate such control. Furthermore, while Internet access is now widespread, access for many small commercial entity locations may be limited or non-existent. Smart meters, on the other hand, are primarily targeted at residential environments, and products designed to interact with smart meters are typically residential-class products not suitable for the commercial setting. Accordingly, solutions that target the residential market do not properly address the needs of the commercial and public entity environment, and current solutions that target the commercial and public entity environment are not well suited for the resident market.

SUMMARY

In general, one innovative aspect of the subject matter described in this specification can be embodied in a system, comprising a wireless controller comprising a wireless controller processing subsystem, a communication subsystem coupled to the wireless controller processing subsystem and configured to transmit messages to and receive messages from a plurality of power control devices over a first network, transmit messages to and receive messages from a wireless smart metering device over a second network, and transmit messages to and receive messages from a system controller over a third network; a data storage device coupled to the wireless controller processing subsystem and storing instructions executable by the wireless controller processing subsystem and in response to such execution cause the wireless controller to perform operations comprising receive an event message from one or more of the wireless smart metering device over the second network or the system controller over the third networks, generate one or more power commands for the power control devices, the one or more power commands configured to cause the power control devices to adjust one or more power loads in response to the event message, and transmit the one or more power commands to the power control devices over the first network. Other embodiments of this aspect include corresponding methods, apparatus, and computer programs configured to perform the actions of the methods, encoded on computer storage devices.

Another innovative aspect of the subject matter described in this specification can be embodied in a system, comprising a system controller comprising a system controller processing subsystem, a first transceiver coupled to the system controller processing subsystem and configured to transmit messages to and receive messages from a plurality of wireless controllers, each of the wireless controllers being respectively associated with only one corresponding managed entity, and wherein there are two or more managed entities associated with the wireless controllers, a data storage device coupled to the system controller processing subsystem and storing data describing the association of managed entities with the wireless controllers and instructions executable by the system controller processing subsystem and in response to such execution cause the system controller to perform operations comprising transmit a poll message to each of the wireless controllers, receive, from each of the wireless controllers, and in response to the poll message, a resource list describing the power control devices communicating with the wireless controller over the first network, and generate, for each wireless controller, respective power management rules that defines power management processes to be take in response to event messages and transmit the respective power management rules to the wireless controller; and a plurality of wireless controllers, each wireless controller comprising a wireless controller processing subsystem and a communication subsystem coupled to the wireless controller processing subsystem and configured to transmit messages to and receive messages from a plurality of power control devices over a first network according to a first protocol, transmit messages to and receive messages from a wireless smart metering device over a second network according to a second protocol, wherein the second protocol is different from the first protocol, transmit messages to and receive messages from the system controller over a third protocol, wherein the third protocol is different the first protocol and the second protocol; and a data storage device coupled to the wireless controller processing subsystem and storing instructions executable by the wireless controller processing subsystem and in response to such execution cause the wireless controller to perform operations comprising receive an event message from the wireless smart metering device according to the second protocol, receive the power management rules from the system controller, determine, based on the power management rules, one or more power management processes in response to the event message, generate one or more power commands for the power control devices based on the power management rules, the one or more power commands configured to cause the power control devices to adjust one or more power loads in response to the event message, and transmit the one or more power commands to the power control devices according to the first protocol. Other embodiments of this aspect include corresponding methods, apparatus, and computer programs configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This written description describes methods, software and systems for delivering wireless power control (e.g., lighting controls) for managed entities while enabling utilities to provide load shedding and demand-response services. In particular, for each location of a managed entity, a wireless controller with multiple transceivers provides connectivity to utility systems, controlled powered devices at the managed entity location, and integration with system controller for managing load of the managed entity.

In some implementations, the system controller transmits a poll message to each of the wireless controllers at each location of a managed entity. In response to the poll message, the system controller receives a resource list describing the power control devices communicating with the wireless controller over a network at the managed entity location. Using this information, the system controller generates, for each wireless controller, respective power management rules that define power management processes to be taken in response to event messages from a smart meter, and transmits the respective power management rules to the wireless controller. The wireless controller receives the power management rules from the system controller. When the wireless controller receives an event message from a smart meter, it determines, based on the power management rules, one or more power management processes in response to an event message, and generates one or more power commands based on the determined power management processes. The power commands are configured to cause the power control devices to adjust one or more power loads in response to the event message.

In other implementations, each wireless controller provides event notifications to the system controller, and the system controller, in turn, generates a corresponding demand response command and transmits the demand response command to the wireless controller. The wireless controller uses the demand response command to generate power commands for power control devices at the managed entity location.

These implementations, and additional aspects, are described in more detail below.

Figure 1:
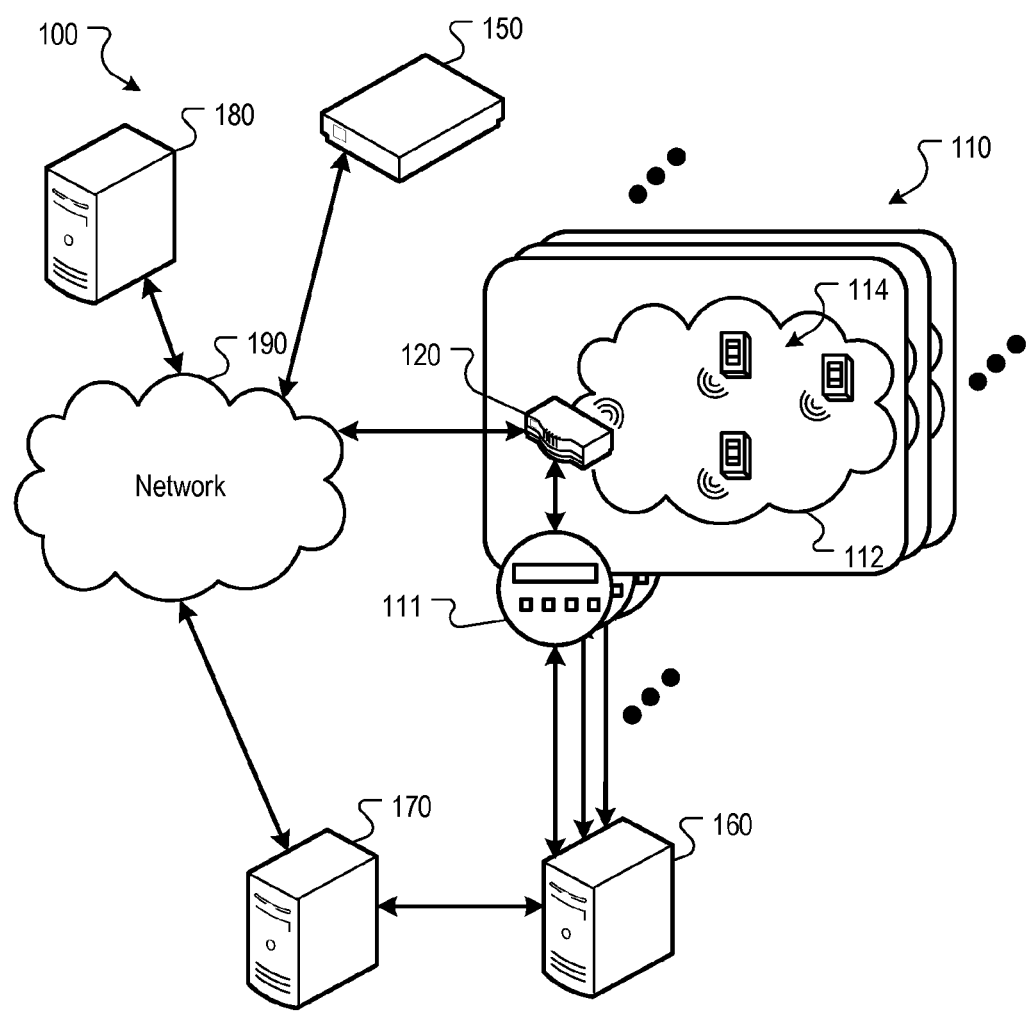
FIG. 1 is a block diagram of a multi-protocol load control system.

FIG. 1 is a block diagram of a multi-protocol load control system 100. The load control system 100 is used to control the load of managed entities at entity locations 110. As used herein, a "managed entity" is an entity associated with an account at the energy provider, and has at least one, and typically multiple, entity locations 110. Each entity location 110 is a location for which a power meter 111 monitors power delivery and consumption. For example, each location 110 can be a building, such as a retail location, and the power meter 111 is a smart meter. As used herein, a "smart meter" is a meter that records consumption for particular time intervals and communicates the information by a communications network to an energy provider for monitoring and billing. The smart meter 111 also enables two-way communication between the meter and the energy provider, and can receive data describing events and transmits the data to the wireless controller 120 located at the location 110.

Deployed in each location 110 is a network 112. The network 112 is formed by power control devices 114 and a wireless controller 120. As used herein, a "wireless controller" is any device that provides controller functionality and which sends control signals to the power control devices 114. A wireless controller can be a dedicated controller, or can be integrated into another device, such as a wireless switch, a wireless sensor, or another power control device.

The wireless controller 120 generates power commands that are transmitted to the power control devices 114, which, in turn, control electrical loads in accordance with the power commands. As will be described in more detail below, the wireless controller 120 can either communicate with the system controller 150 to generate the power commands, or, alternatively, can receive power management rules from the system controller 150 and use the power management rules to generate the power commands.

The smart meter 111 communicates with the wireless controller 120, providing event messages that are received from a head end 160 of a utility provider information system 170. Typically, the events that are described cause the wireless controller 120 to shed load, or hold a current load steady.

Based on the power management rules, the wireless controller 120 selects one or more power management processes (e.g., shed load or hold a current load steady) in response to an event message received from the smart meter 111 and generates power commands. The power commands are transmitted to the power control devices 114, which in turn cause the electrical devices they are controlling to adjust their loads (or consumption over time) accordingly.

The protocols that are used to communicate between the wireless controller 120 and the system controller 150, between the wireless controller 120 and the power controllers 114, and between the wireless controller 120 and the smart meter 111 may be different. For example, the wireless devices of the network 112 may conform to the Zigbee Pro specification, which is based on the IEEE 802.15.4 standard. The IEEE 802.15.4 standard is a standard for low-rate wireless personal area networks (LR-WPANs). However, the smart meter 111 may use the Smart Energy 2.0 protocol, which is incompatible with the protocol interface of the network 112 (Zigbee Pro) within the location 110. Furthermore, the protocol used to communicate with the system controller 150 is also incompatible with the protocol used by the smart meter 111 and the power control devices 114.

Alternatively, some of the protocols may be the same. For example, the network over which the wireless controller 120 and the smart meter 111 communicate may differ from the network over which the wireless controller 120 and the power controllers 114 communicate, but the protocol for both networks may be the same.

Because centralized management of the location 110 can be facilitated by communicating with the wireless controller 120, the wireless controller 120 includes three transceivers—a first to communicate with the smart meter 111 over a first protocol, a second to communicate with the power control devices 114 over a second protocol, and a third to communicate with the system controller 150 over a third protocol. The wireless controller 120 facilitates and the system controller 150 facilitate the central management and maintenance of multiple such wireless controllers, facilitates the aggregate data from multiple such wireless controllers for coordinated control, and facilitates aggregating locations of managed entities into groups, such as grouping the locations of each managed entity into a corresponding group, and even sub-groups of a managed entity based on one or more of geographies, markets, utility territory, etc.

In some implementations, the system controller 150 receives OpenADR messages from a demand response automation server (DRAS) 180. The DRAS sever 180 may be maintained by the utility provider, or by another party. The system controller 150 processes the message to generate and transmit event messages to the corresponding wireless controllers 120 for which the OpenADR message was applicable.

Figure 2:
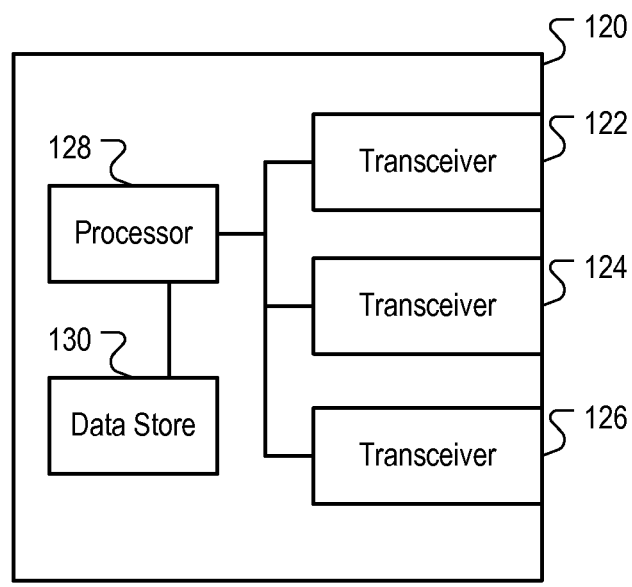
FIG. 2 is a block diagram of a wireless controller.
Figure 3:
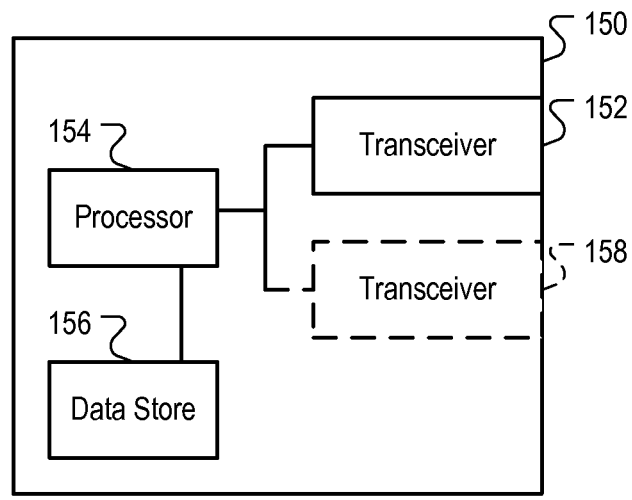
FIG. 3 is a block diagram of a system controller.

FIG. 2 is a block diagram of a wireless controller 120, and FIG. 3 is a block diagram of a system controller 150. The example wireless controller 120 of FIG. 2 and the example system controller 150 of FIG. 3 are used to realize the system 100 of FIG. 1.

The wireless controller 120 includes several subsystems—a communication subsystem that, for example, includes transceivers 122, 124, and 126, a processor 128, and a data store 130. The first transceiver 122 is, for example, a first radio coupled to the processor 128 and configured to transmit messages to and receive messages from the power control devices 114 over the network 112 according to a first protocol. For example, the first protocol can be a protocol based on ZigBee Pro. The processor 128 generates power commands and transmits the commands to the power control devices 114 over the network 112.

The second transceiver 124 is, for example, a second radio coupled to the processor 128 and configured to transmit messages to and receive messages from the wireless smart metering device 111 over a second network according to a second protocol. As described above, the second protocol may be different from the first protocol, e.g., the Smart Energy 2.0 protocol used to establish a network connecting the wireless controller 120 and the smart meter 111.

The third transceiver 126 is coupled to the processor 128 and configured to transmit messages to and receive messages from the system controller 150 over a third protocol. The third protocol differs from the first and second protocols. For example, the third transceiver 126 can be a radio that communicates over a 3G, 4G or GPRS protocol; alternatively the third transceiver 126 can be a wired transceiver that connects to a router to communicate with the system controller 150 over the Internet 190 (e.g., a cable or DSL connection), or some other network that is used to establish data communication between the system controller 150 and the wireless controllers 120.

Although the transceivers are shown as separate components, two or more can be realized by a single device, provided the single device has the capability to communicate over both protocols. In these situations, the transceivers are merely logical representations of the capability to receive data over different protocols.

The data storage device 130 coupled to the processor 128 and stores instructions executable by processor 128. Additionally, the storage device 130 stores other data, such as a resource list describing the power control devices 114 communicating with the wireless controller 120 over the network 112, and, in some implementations, power management rules received from the system controller 150.

The system controller 150, depicted in FIG. 3, also includes several subsystems—a communication subsystem of one (or more) transceivers 152, a processor 154, and a data store 156. The transceiver 152 is coupled to the processor 154 and configured to transmit messages to and receive messages from multiple wireless controllers 120 according to the third protocol. The system controller 150 can also include other transceivers 158 to communicate with other systems, such as utility information system 180 (or, alternatively a DRAS server) over the network 190. The second transceiver 158 can be used if the first transceiver 152 communicates with the wireless controllers 120 over a protocol that is different from the protocol used to communicate with the utility information system 180. Again, although the transceivers are shown as separate components, two or more transceivers can be realized by a single device, provided the single device has the capability to communicate over both protocols.

The data storage device 156 is coupled to the processor 154 and stores instructions executable by the processor 158. Additionally, the data storage device 156 stores information received from the wireless controllers 120, and also groups the wireless controllers 120 according to managed entities.

Depending on the implementation, the system controller 150 provides power management rules to the wireless controller, or instructs the wireless controllers to respond to event messages received from the smart meters 111. These implementations are described with reference to FIGS. 4 and 5 below.

Figure 4:
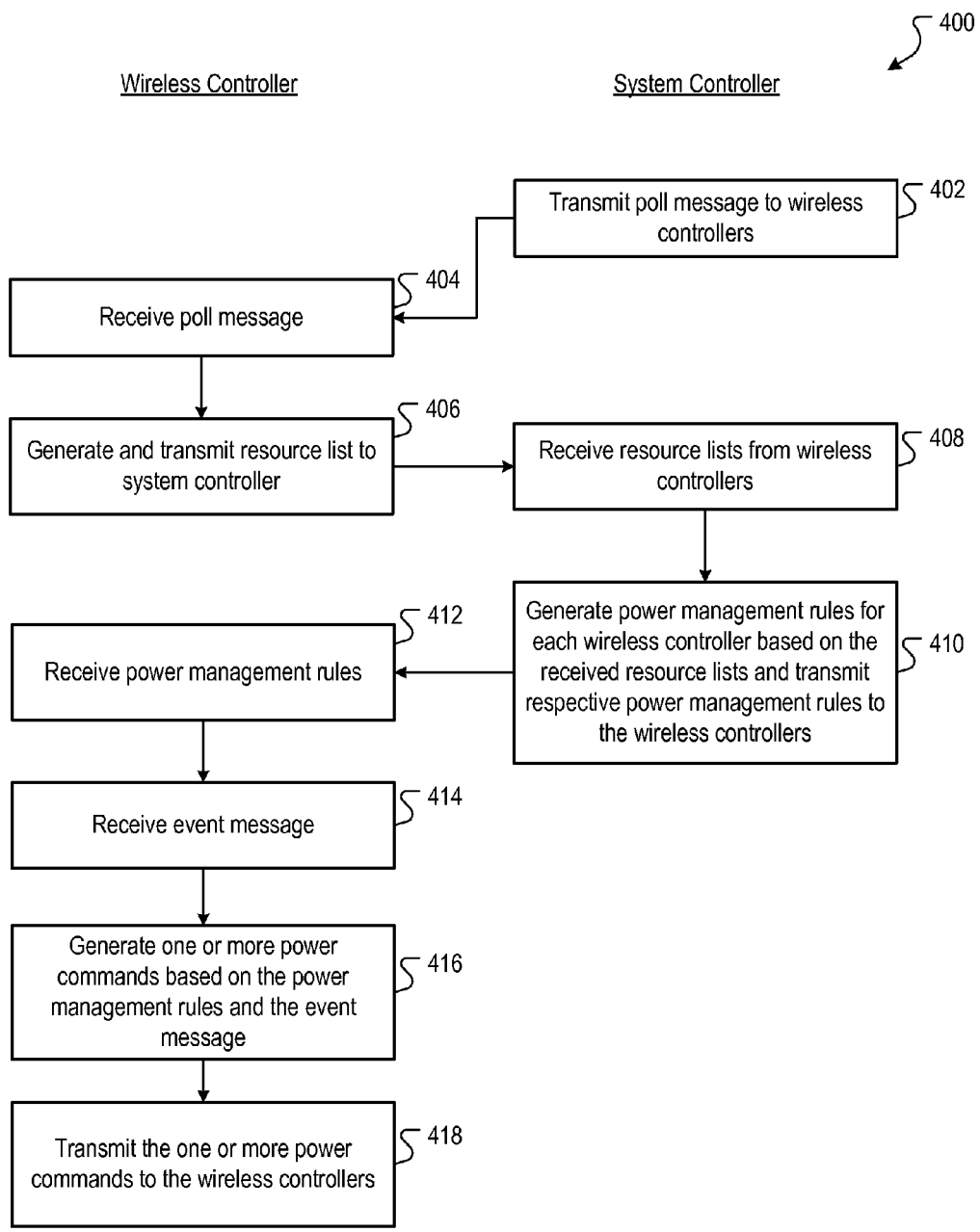
FIG. 4 is a flow diagram of an example process of controlling an aggregate load for a controlled entity.

FIG. 4 is a flow diagram of an example process 400 of controlling an aggregate load for a controlled entity. Portions of the process 400 are implemented in the system controller 150, and other portions are implemented in the wireless controller 120. The process 400 is used to generate power management rules for the wireless controllers 120 and distribute the power management rules to the wireless controllers 120. The wireless controllers 120 then handles power management at each location 110 locally.

The system controller generates and transmits a poll message to each of the wireless controllers (402). The poll message can be broadcast to all wireless controllers, or, alternatively, sent to only a subset of the wireless controllers, e.g., only the wireless controllers associated with one managed entity, or a geographic region of the managed entity.

Each wireless controller to which the poll message is sent receives the poll message (404), and in response to the poll message, generates a resource list describing the power control devices communicating with the wireless controller over the first network, and transmits the resource list to the system controller (406). For example, each wireless controller, in turn, polls the respective power control devices on its associated network, or may have already done so previously and stored the information in its data store (130) and provides the results of the poll as a resource list.

The system controller receives the resource lists (408). In response, for each wireless controller, the system controller 150 generates respective power management rules that defines power management processes to be taken in response to event messages, and transmits the respective power management rules to the wireless controllers (410). For example, the system controller 150 may receive hundreds of resource lists. In response, the system controller 150 determines a corresponding managed entity associated with each resource list received from the wireless controllers and groups the resource lists accordingly. Then the system controller 150 generates the respective power management rules based on the grouped resource lists (e.g., the resource list received from a wireless controller and at least one other resource list received from another wireless controller, wherein both wireless controllers are associated with the same managed entity). The poll message, responses, and rules are sent according to the third protocol.

The rules can be based, in part, on pre-defined conditions specified by the managed entity (e.g., increase air conditioning level by +2 degrees during peak hours and when a load shedding request is received; turn off non-essential lighting and plug loads during peak hours and when a load shedding request is received; etc.). The rules can also be specific to each location and tailored to the power devices specified in the resource list (e.g., for location X having lighting zones Y and Z, lighting zone Z is non-essential, etc.). A variety of power management smoothing and shedding algorithms can be used to generate the rules for the locations.

Each wireless controller 120 receives the power management rules (412) and stores them in the data store. Thereafter, when the wireless controller 120 receives an event message from the smart meter (414), the wireless controller 120 generates, based on the power management rules, one or more power commands (416). The power commands are configured to cause the power control devices to adjust one or more power loads in response to the event message. The power commands are sent to the wireless controllers according to the second protocol (418), and the event message is received according to the first protocol. Accordingly, power management at each location is coordinated with the system controller 150.

Figure 5:
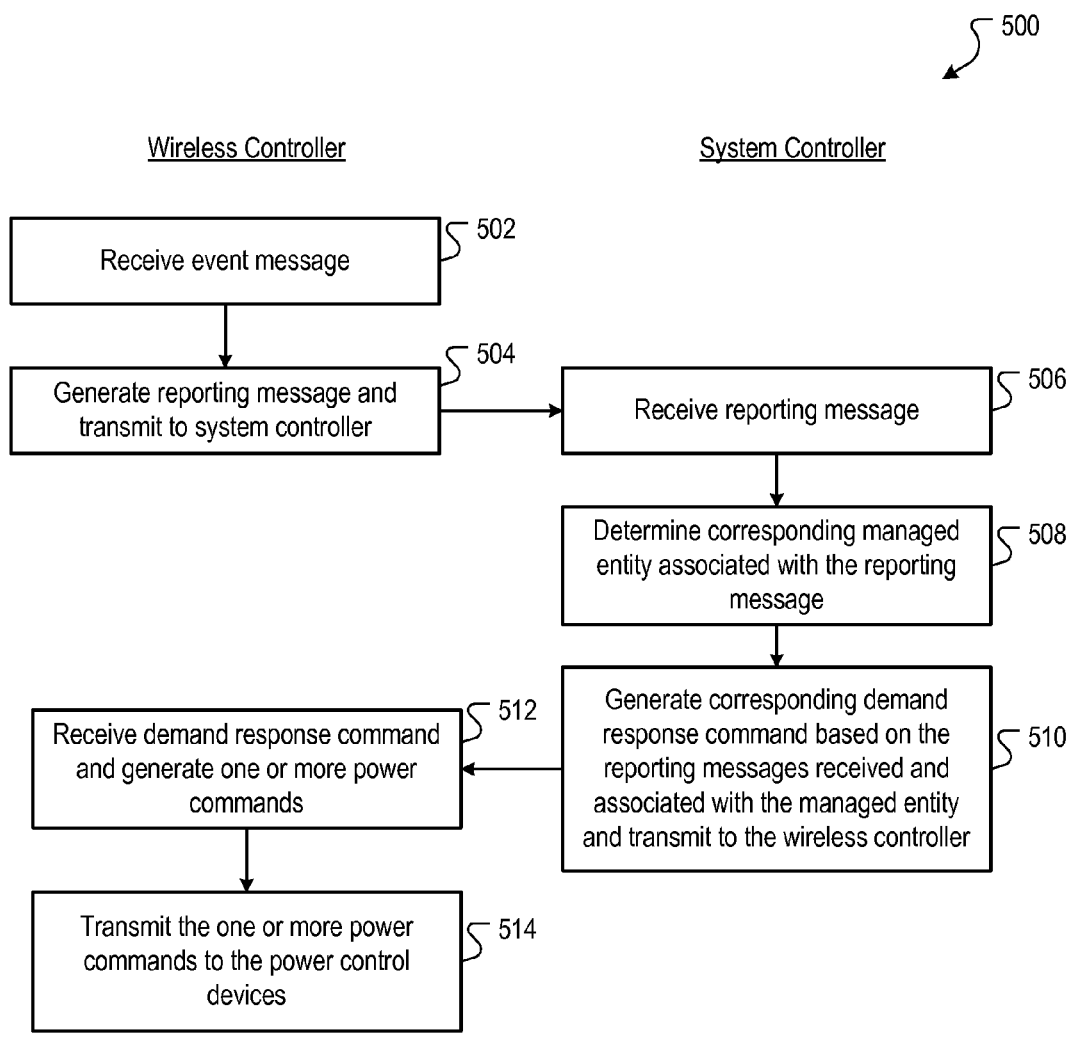
FIG. 5 is a flow diagram of another example process of controlling an aggregate load for a controlled entity.
Like reference numbers and designations in the various drawings indicate like elements.

FIG. 5 is a flow diagram of another example process 500 of controlling an aggregate load for a controlled entity. Portions of the process 500 are implemented in the system controller 150, and other portions are implemented in the wireless controller 120. The process 500 is used to generate power management commands for the wireless controllers 120. The process 500 differs from the process 400 in that the system controller 150 determines power management adjustments centrally, and then distributes demand responses that cause the wireless controllers 120 to implement the power management adjustments. To avoid congestion in the drawings, the process of polling the wireless controllers for resource lists is omitted from the drawing.

The wireless controller receives an event message from a smart meter (502), and generates and transmits a reporting message to the system controller (504). For example, the reporting message describing the event message received at the wireless controller, and identifies the managed entity location and the managed entity.

The system controller receives the reporting message (506) and determines the corresponding managed entity associated with the reporting message (508). Using the resource list previously received from the wireless controller (or rules generated for the location and stored locally at the system controller); the system controller generates corresponding demand response commands based on the received reporting messages and transmits the demand response command to the wireless controller (510). The demand response command is configured to cause the wireless controller to generate the power commands for the power control devices, which, in turn, cause the power control devices to adjust the power load at the location. The system controller can take into account other reporting messages received from other wireless controllers associated with the reporting message. For example, the system controller 150 may determine that, in the aggregate, an appropriate amount of load has been shed from the locations of the managed entity, and that no additional load need be shed by the managed entity.

The wireless controller 120 receives the demand response command from the system controller and, in response, generates the power commands for the power control devices in response (512). The power commands are then transmitted to the power control devices (514).

The process 500 can be implemented without a smart meter 111 present at every location of a managed entity. For a managed entity, the wireless controller 120 at a location in which a smart meter is located can work in conjunction with the system controller 150 and other wireless controllers through the data communications facilitated by the system controller. Thus, a demand response action for a message received from a smart meter 111 can be carried out at the location at which the smart meter is located, or, alternatively, at another location that does not have a smart meter 111. For example, the demand response action may be a request to shed a certain load amount. However, the location at which the smart meter is located may not be able to comply with the request. Accordingly, the wireless controller 120 can provide the request to the system controller 150, which can then determine other locations of the managed entity that are candidates to fulfill the request (e.g., locations receiving power from the same utility provider, or same substation, or other criteria that may be used to identify one or more second locations of a managed entity that can fulfill the request initially sent to the first location of the managed entity).

The request can then be provided to the wireless controllers of the candidate locations, and one (or more) of the wireless controllers can generate commands locally to fulfill the request. For example, the request may be to shed 2 kilowatts of load. Two other locations of the managed entity may each be able to shed 1 kilowatt of load, and thus both locations may each shed a respective kilowatt to meet the request. The load shedding can then be reported to the utility by means of the system controller 150 over the network 190, or by a message transmitted to the smart meter 111 that originally sent the request.

In other implementations, the system controller 150 can receive event notifications from the energy provider, e.g., over the Internet. Corresponding commands can then be sent to the wireless controllers, thereby eliminating the need for the wireless controllers to communicate with the smart meters. For example, the system controller then selects, from the list of available wireless controllers, the appropriate subset of wireless controllers that are within an energy provider's service area or that are within a collection of buildings through which the energy provider desires common control.

Although the processes 500 differs from the process 400 in that the system controller 150 determines power management adjustments centrally, both central and local control can also be implemented in parallel, i.e., the processes of centralized control and local control are not mutually exclusive. For example, a particular wireless controller can receive an event according to process steps 414 and 502, and then simultaneously move on the steps 416 and 504. As the process 500 continues as described above, the command that is eventually sent from the system controller 150 can be compared to the command generated at the step 416. If there is a conflict, one or more conflict resolution rules can be implemented to choose from among the conflicting commands. Example conflict resolution rules include a centrally generated command (e.g., a command generated by the system controller 150) taking priority over a locally generated command (e.g., a command generated by the wireless controller); or a locally generated command taking priority over a centrally generated command. Other conflict resolution rules can also be used.

In additional to facilitating coordinated management, the system controller 150 can also provide maintenance (e.g., firmware updates), for the wireless controllers 120. In some implementations, in the event that the smart meter 111 protocols and the network protocols over which the wireless power control devices 114 communicate become compatible, the system controller 150 can send updates to the wirelesses controller to enable migration of three-protocol solution to two-protocol solution in existing deployments. For example, the system controller 150 can send a firmware update to the wireless controllers, and the wireless controllers, in turn, can send the updates to the power control devices. Thereafter, the wireless controller can implement a process to merge the smart meter 111 and the power control devices 114 onto a single network.

Although the first and second protocols are described as wireless protocols, the interfaces could be wired, using technologies such as PLC (Powerline Carrier) and Ethernet.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
 a system controller comprising:
  a system controller processing subsystem;
  a first transceiver coupled to the system controller processing subsystem and configured to transmit messages to and receive messages from a plurality of wireless controllers, each of the wireless controllers being respectively associated with only one corresponding managed entity where a managed entity is an entity at a location having an account with an energy provider, and wherein there is at least a first managed entity associated with a first wireless controller at a first location for which a first wireless smart metering device monitors power delivery and consumption, and a second managed entity associated with a second wireless controller at a second location for which a second wireless smart metering device monitors power delivery and consumption;
  a data storage device coupled to the system controller processing subsystem and storing data describing the association of managed entities with the wireless controllers, including the association of the first managed entity with the first wireless controller and the second managed entity associated with the second wireless controller, and instructions executable by the system controller processing subsystem and in response to such execution cause the system controller to perform operations comprising:
   transmit a poll message to the first wireless controller;
    receive, in response to the poll message, a resource list describing power control devices located at the first location and communicating with the first wireless controller; and
   generate power management rules that define power management processes to be taken in response to an event message received by the first wireless controller from the wireless smart metering device and transmit the respective power management rules to the first wireless controller;
 wherein the first wireless controller comprises:
  a wireless controller processing subsystem;
  a communication subsystem coupled to the wireless controller processing subsystem and configured to:
   transmit messages to and receive messages from a plurality of power control devices over a first network according to a first protocol;
   transmit messages to and receive messages from the first wireless smart metering device over a second network according to a second protocol, wherein the second protocol is different from the first protocol; and
   transmit messages to and receive messages from the system controller over a third network over a third protocol that is different from the first protocol and the second protocol;
  a data storage device coupled to the wireless controller processing subsystem and storing instructions executable by the wireless controller processing subsystem and in response to such execution cause the first wireless controller to perform operations comprising:
   in response to receiving the poll message from the system controller, transmit to the system controller the resource list;
   receive an event message from one or more of the wireless smart metering device over the second network or the system controller over the third network;
   receive the power management rules from the system controller;
   generate one or more power commands for the power control devices based on the power management rules, the one or more power commands configured to cause the power control devices to adjust one or more power loads in response to the event message; and
   transmit the one or more power commands to the power control devices over the first network.

2. The system of claim 1, wherein the instructions executable by the system controller processing subsystem further cause the system controller to:
 determine the corresponding managed entity associated with each resource list received from the first wireless controller; and
 generate the respective power management rules based on the resource list received from the first wireless controller and at least one other resource list received from another wireless controller, the at least one other resource list being associated with the corresponding managed entity that is associated with a reporting message received from the first wireless controller.

3. The system of claim 1, wherein the instructions executable by the wireless controller processing subsystem cause the wireless controller to perform further operations comprising coordinating the generation and transmission of the one or more power commands with the system controller.

4. The system of claim 3, wherein:
the system controller comprises:
a second transceiver coupled to the system controller processing subsystem and configured to transmit messages to and receive messages from a plurality of wireless controllers; and
the data storage device storing instructions executable by the system controller processing subsystem that in response to execution cause the system controller to perform operations comprising:
receive reporting messages describing the event messages from the wireless controllers; and
for each wireless controller, generate a corresponding demand response command and transmit the demand response command to the wireless controller, the demand response command configured to cause the wireless controller to generate the one or more power commands for the power control devices; and
wherein the first wireless controller is one of a plurality of wireless controllers, and for each wireless controller, the instructions executable by the system controller processing subsystem cause the system controller to perform further operations comprising:
generating a reporting message describing the event message received from the smart metering device;
transmit the reporting message to the system controller; and
in response to receiving demand response command from the system controller, generate the one or more power commands for the power control devices from the received demand response command.

5. The system of claim 4, wherein the instructions executable by the system controller processing subsystem cause the system controller to perform further operations comprising:
determine a corresponding managed entity associated with each reporting message, wherein each reporting message is associated with only one managed entity and there are two or more managed entities; and
generating a corresponding demand response command for each wireless controller comprises:
determining a corresponding managed entity associated with the reporting message received from the wireless controller; and
generate the corresponding demand response command based on the reporting message received from the wireless controller and at least one other reporting message received from another wireless controller, the at least one other reporting message being associated with the corresponding managed entity that is associated with the reporting message received from the wireless controller.

6. The system of claim 4, wherein the first and second transceivers are first and second radios, respectively.

7. The system of claim 4, wherein the event message is received from the system controller and includes data responsive to one of a plurality of plurality of demand response event messages received by the system controller.

8. The system of claim 7, wherein the demand response event messages are OpenADR messages.

9. The system of claim 1, wherein the plurality of power control devices include lighting control devices.

10. The system of claim 1, wherein in response to receiving the poll message, transmit to the system controller the resource list comprises:
access power device information stored prior to receiving the poll message, wherein the power device information describes the power control devices communicating with the wireless controller; and
transmit the power device information to the system controller.

11. The system of claim 1, wherein in response to receiving the poll message, transmit to the system controller the resource list comprises:
poll the power control devices communicating with the first wireless controller over the first network; and
transmit to the system controller results of the poll of the power control devices as the resource list.

12. A system, comprising:
a system controller comprising:
a system controller processing subsystem;
a first transceiver coupled to the system controller processing subsystem and configured to transmit messages to and receive messages from a plurality of wireless controllers, each of the wireless controllers being respectively associated with only one corresponding managed entity where each managed entity is an entity at a respective location having an account with an energy provider and each managed entity is at a respective location for which a respective wireless smart meter monitors power delivery and consumption, and wherein there is at least a first managed entity associated with a first wireless controller at a first location for which a first wireless smart metering device monitors power delivery and consumption and a second managed entity associated with a second wireless controller at a second location for which a second wireless smart metering device monitors power delivery and consumption;
a data storage device coupled to the system controller processing subsystem and storing data describing the association of managed entities with the wireless controllers, including the association of the first managed entity with the first wireless controller and the second managed entity associated with the second wireless controller, and instructions executable by the system controller processing subsystem and in response to such execution cause the system controller to perform operations comprising:
transmit a poll message to each of the wireless controllers;
receive, from each of the wireless controllers, and in response to the poll message and for each respective location of the wireless controller, a resource list describing power control devices at the respective location communicating with the wireless controller at the respective location; and
generate, for each wireless controller, respective power management rules that defines power management processes to be take in response to event messages received by the wireless controller from the wireless smart metering device at the location of the wireless controller and transmit the respective power management rules to the wireless controller; and
a plurality of wireless controllers, each wireless controller comprising:
a wireless controller processing subsystem;
a communication subsystem coupled to the wireless controller processing subsystem and configured to:
transmit messages to and receive messages from a plurality of power control devices over a first network according to a first protocol;

transmit messages to and receive messages from a wireless smart metering device over a second network according to a second protocol, wherein the second protocol is different from the first protocol;

transmit messages to and receive messages from the system controller over a third protocol, wherein the third protocol is different the first protocol and the second protocol; and a data storage device coupled to the wireless controller processing subsystem and storing instructions executable by the wireless controller processing subsystem and in response to such execution cause the wireless controller to perform operations comprising:

receive an event message from the wireless smart metering device according to the second protocol;

receive the power management rules from the system controller;

determine, based on the power management rules, one or more power management processes in response to the event message;

generate one or more power commands for the power control devices based on the power management rules, the one or more power commands configured to cause the power control devices to adjust one or more power loads in response to the event message; and transmit the one or more power commands to the power control devices according to the first protocol.

13. The system of claim 12, wherein the instructions executable by the system controller processing subsystem cause the system controller to perform further operations comprising:

determine a corresponding managed entity associated with each resource list received from each of the plurality of the wireless controllers; and generate the respective power management rules based on the resource list received from the wireless controller and at least one other resource list received from another wireless controller, the at least one other resource list being associated with the corresponding managed entity that is associated with a reporting message received from the wireless controller.

14. A system, comprising:

a system controller comprising:

a system controller processing subsystem;

a first transceiver coupled to the system controller processing subsystem and configured to transmit messages to and receive messages from a plurality of wireless controllers, each of the wireless controllers being respectively associated with only one corresponding managed entity where a managed entity is an entity at a location and having an account with an energy provider, and wherein there is at least a first managed entity associated with a first wireless controller at a first location for which a first wireless smart metering device monitors power delivery and consumption, and a second managed entity associated with a second wireless controller at a second location for which a second wireless smart metering device monitors power delivery and consumption;

a data storage device coupled to the system controller processing subsystem and storing data describing the association of managed entities with the wireless controllers, including the association of the first managed entity with the first wireless controller and the second managed entity associated with the second wireless controller, and instructions executable by the system controller processing subsystem and in response to such execution cause the system controller to perform operations comprising:

receive reporting messages describing event messages from the wireless controllers;

for each wireless controller, generate a corresponding demand response command and transmit the demand response command to the wireless controller, the demand response command configured to cause the wireless controller to generate one or more power commands for power control devices at the location of the wireless controller; and a plurality of wireless controllers, each wireless controller, each wireless controller at a respective location and comprising:

a wireless controller processing subsystem;

a communication subsystem coupled to the wireless controller processing subsystem and configured to:

transmit messages to and receive messages from a plurality of power control devices at the respective location over a first network according to a first protocol;

transmit messages to and receive messages from a wireless smart metering device at the respective location over a second network according to a second protocol, wherein the second protocol is different from the first protocol;

configured to transmit messages to and receive messages from the system controller over a third protocol, wherein the third protocol is different the first protocol and the second protocol; and a data storage device coupled to the wireless controller processing subsystem and storing instructions executable by the wireless controller processing subsystem and in response to such execution cause the wireless controller to perform operations comprising:

receive an event message from the wireless smart metering device at the respective location according to the second protocol;

generate a one or more power commands for the power control devices, the one or more power commands configured to cause the power control devices to adjust one or more power loads in response to the event message; and transmit the one or more power commands to the power control devices according to the first protocol.

15. The system of claim 14, wherein the instructions executable by the system controller processing subsystem cause the system controller to perform further operations comprising:

determine a corresponding managed entity associated with each reporting message, wherein each reporting message is associated with only one manage entity and there are two or more managed entities; and generating a corresponding demand response command for each wireless controller comprises:

determining a corresponding managed entity associated with the reporting message received from the wireless controller; and generate the corresponding demand response command based on the reporting message received from the wireless controller and at least one other reporting message received from another wireless controller, the at least one other reporting message being associated with the corresponding managed entity that is associated with the reporting message received from the wireless controller.

16. The system of claim 15, wherein, for each wireless controller, the instructions executable by the system controller processing subsystem cause the system controller to perform further operations comprising:
generating a reporting message describing the event message received from the smart metering device;
transmit the reporting message to the system controller; and
in response to receiving demand response command from the system controller, generate the one or more power commands for the power control devices from the received demand response command.

* * * * *

UNITED STATES PATENT AND TRADEMARK OFFICE
CERTIFICATE OF CORRECTION

| | |
|---|---|
| PATENT NO. | : 9,220,058 B1 |
| APPLICATION NO. | : 13/014374 |
| DATED | : December 22, 2015 |
| INVENTOR(S) | : Jason Yew Choo Choong |

It is certified that error appears in the above-identified patent and that said Letters Patent is hereby corrected as shown below:

In the Claims:

Column 13, line 57, claim 7 – delete "plurality of plurality of" and insert --plurality of--.

Signed and Sealed this
Twelfth Day of April, 2016

Michelle K. Lee
*Director of the United States Patent and Trademark Office*